United States Patent
Barak et al.

(10) Patent No.: US 7,564,932 B2
(45) Date of Patent: Jul. 21, 2009

(54) METHOD AND SYSTEM FOR ENHANCING BIT RATE IN DMT QUAD SPECTRUM SYSTEMS

(75) Inventors: Ehud Barak, Red Bank, NJ (US); Albert Rapaport, Morganville, NJ (US)

(73) Assignee: Conexant Systems, Inc., Red Bark, NJ (US)

( * ) Notice: Subject to any disclaimer, the term of this patent is extended or adjusted under 35 U.S.C. 154(b) by 715 days.

(21) Appl. No.: 10/996,054

(22) Filed: Nov. 24, 2004

(65) Prior Publication Data

US 2005/0135495 A1    Jun. 23, 2005

Related U.S. Application Data

(60) Provisional application No. 60/524,900, filed on Nov. 26, 2003.

(51) Int. Cl.
*H03D 1/04* (2006.01)
*H03D 1/06* (2006.01)
*H03K 5/01* (2006.01)
(52) U.S. Cl. .................. 375/346; 375/260; 375/259
(58) Field of Classification Search .............. 375/346, 375/260, 259
See application file for complete search history.

(56) References Cited

U.S. PATENT DOCUMENTS

| | | | |
|---|---|---|---|
| 6,035,000 A * | 3/2000 | Bingham | 375/296 |
| 7,010,027 B1 * | 3/2006 | Mestdagh et al. | 375/222 |
| 7,277,513 B2 * | 10/2007 | Ahmed et al. | 375/346 |
| 2002/0191690 A1 * | 12/2002 | Pendergrass et al. | 375/239 |
| 2003/0099286 A1 * | 5/2003 | Graziano et al. | 375/222 |
| 2003/0108035 A1 * | 6/2003 | Langberg et al. | 370/352 |
| 2003/0108095 A1 * | 6/2003 | Duvaut et al. | 375/222 |
| 2003/0132814 A1 * | 7/2003 | Nyberg | 333/81 R |
| 2003/0227966 A1 * | 12/2003 | Im | 375/222 |
| 2004/0042543 A1 * | 3/2004 | Li et al. | 375/222 |
| 2004/0096052 A1 * | 5/2004 | Liu | 379/399.01 |

* cited by examiner

*Primary Examiner*—David C Payne
*Assistant Examiner*—Brian J Stevens
(74) *Attorney, Agent, or Firm*—Thomas, Kayden, Horstemeyer & Risley, LLP

(57) ABSTRACT

Systems and methods for achieving a maximum bit rate in a Discrete MultiTone (DMT) system using a quad spectrum under constraints of avoiding interference with radio frequency interference (RFI) are described. At least one embodiment utilizes bins in notched areas for transmission over short loops without violating the power spectral density (PSD) mask in order to optimize bit allocation.

15 Claims, 7 Drawing Sheets

METHOD AND SYSTEM FOR ENHANCING BIT RATE IN DMT QUAD SPECTRUM SYSTEMS

CROSS REFERENCE TO RELATED APPLICATIONS

This patent application claims priority to U.S. Provisional Application No. 60/524,900 titled "Method And System For Optimizing Bit Rate In A DMT Quad Spectrum System", filed Nov. 26, 2003, which is hereby incorporated by reference herein in its entirety.

FIELD OF THE INVENTION

The present invention relates generally to enhancing or optimizing bit rate in Discrete MultiTone (DMT) quad spectrum systems and, more particularly, to a method and system for enhancing or optimizing or enhancing or optimizing bit rate with interference notches, e.g., Radio Frequency Interference (RFI) notches.

BACKGROUND OF THE INVENTION

With the increasing popularity of the Internet and other content-heavy electronic communication systems, there has been a substantial need for reliable and affordable high bandwidth mediums for facilitating data transmissions between service providers and their customers. In relation to the requirement that such mediums be affordable to consumers, a cost-effective manner for providing service to customers involves using infrastructure already present in most locations. Accordingly, over recent years, the two such mediums most widely meeting these requirements include cable television (CATV) and conventional copper wire telephone systems (plain old telephone system or POTS).

Relating specifically to the adaptation of POTS telephone lines to carry data at high-bandwidth or "broadband" data rates, a number of Digital Subscriber Line (DSL) standards and protocols have been proposed. DSL essentially operates by formatting signals using various Time Domain Equalization techniques to send packets over copper wire at high data rates. An offshoot of conventional DSL is Asymmetric Digital Subscriber Line (ADSL) and is considered advantageous for its ability to provide very high data rates in the downstream (i.e., from service provider to the user) direction by sacrificing speed in the upstream direction. Consequently, end user costs are minimized by providing higher speeds in the most commonly used direction. Further, ADSL provides a system that applies signals over a single twisted-wire pair that simultaneously supports conventional POTS or Integrated Services Digital Network (ISDN) service as well as high-speed duplex (simultaneous two-way) digital data services.

DSL is the fastest growing among emerging broadband technologies for very good reasons. First of all, DSL utilizes the existing copper wire network infrastructure. Secondly, compared to the voice modems, such as V.34 and V.90, used in most personal computers that provide up to 56 kbps dial-up connection, DSL provides a high bandwidth, always-on connection with typical connection speeds from 384 kbps to 6 Mbps and higher. Moreover, DSL is affordable with easy installation, simple turn-up, and high service reliability. The successful deployment of DSL is capable of providing digital broadband connection to anyone with an analog telephone line.

DSL services have been standardized over time by regional organizations such as, American National Standard Institute (ANSI), European Telecommunication Standard Institute (ETSI), and by world telecommunication organization International Telecommunication Union (ITU). For example, proposed standards for ADSL are set forth by the International Telecommunications Union, Telecommunication Standardization Section (ITU-T). A first, conventional, ADSL standard is described in ITU-T Recommendation G.992.1— "Asymmetric Digital Subscriber Line (ADSL) Transceivers", the body of which is incorporated herein by reference. A second, more recently proposed standard is the G.992.2 or 'G.lite' standard, further described in ITU-T Recommendation G.992.2—"Splitterless Asymmetric Digital Subscriber Line (ADSL) Transceivers", also incorporated by reference herein. The G.lite standard is a variant of the G.992.1 standard, with modifications directed primarily to work in a splitterless environment (i.e., without a splitter at the remote user end to separate the voice traffic from the digital data traffic).

These DSL standards define data communication protocols to connect customer premise equipment (CPE) to the central office (CO) and to provide connections to various networks, such as DSL service providers, virtual private networks (VPN), or the Internet. Various forms of digital data (e.g., voice, video, and data) can be transported using DSL technology. For transport of voice, DSL equipment is connected to the public switched telephone network (PSTN). For transport of video and data, DSL equipment uses the Internet via an Internet service provider (ISP). Voice over DSL (VoDSL) is capable of providing computer-to-computer, computer-to-telephone, and telephone-to-telephone voice services using an integrated access device (IAD). Video over DSL includes transport of data in various formats, including, e.g., MPEG-1 or MPEG-2 files, video conferencing using Internet Protocol (IP) standard such as ITU H.323, WebCam, and video mail. In addition, DSL supports simple data transport, e.g., bearer services, for virtual private network (VPN), leased data line such as T1 and E1, Point-to-Point Protocol (PPP), Asynchronous transfer mode (ATM), and Internet Protocol (IP).

Like other communication technologies, DSL has gone though a major evolution over the last decade and a collection of technologies, commonly referred to as xDSL, are developed under the umbrella of DSL. One type of subscriber loop digital transmission technology involves an integrated services digital network (ISDN), which has replaced a significant portion of the analog phone lines in Europe and Japan. ISDN offers integrated voice and data services and connection speed up to 144 kbps. Due to the high cost of deployment, an alternative solution called integrated digital loop carrier (IDLC) was deployed in United States. However, resulting data rates were considered inadequate for individual customers. As a result, advanced DSL technologies were developed including HDSL, SDSL, ADSL, HDSL2, SHDSL, and VDSL, all of which are capable of connection speed in excess of 1 Mbps. These advanced DSL technologies were developed to address different needs and application demands, while serving different market segments. For example, SHDSL is a symmetric service designed for long reach office applications with connection speed of 1.5 Mbps, whereas, VDSL is designed to provide a very high-speed asymmetric service for a short-range applications.

DSL systems achieve high bit rates due to an effective application of Digital Signal Processing (DSP) techniques which are enabled by advances in DSP algorithm design and VLSI design, which provides tools to physically implement these techniques and corresponding algorithms. Among the various techniques designed for communication applications, Discrete MultiTone (DMT) provides bit rates close to a maximum achievable level. In fact, due to this property and other properties, DMT has been elected as the line coding technique for the international ADSL standard.

DMT technique deals with the linear distortion caused by channel spread where the channel is divided into smaller channels with no channel spread, thereby minimizing distortion. However, the length of allowable channel spread is limited by a symbol prefix length used by the DMT system. In real life applications, however, the channel length is generally greater than the prefix length and further increases in length as the distance between the CO and the user increases. Therefore, a form of preprocessing received data is useful for shortening the effective channel length seen by the DMT receiver to a length less than or equal to the prefix length. The most common approach, known as Time domain Equalization (TEQ), is to apply a linear filtering to received data samples to shorten the effective channel spread.

In a typical DMT based modem, the TEQ filter is located after the receive filter and before the DMT receiver block. Given this structure, one major concern involves designing an optimal and efficient algorithm to optimize bit rate in DMT systems, such as DMT Quad spectrum systems. Ultimate optimization goal involves maximizing data communication rate of the DMT system. Therefore, it is desirable to develop techniques for achieving optimal bit rate for improved efficiency and overall performance.

Therefore, there is a need in the art of ADSL systems for a more efficient method and system for enhancing or optimizing bit rate in DMT systems.

SUMMARY OF THE INVENTION

Aspects of the present inventions overcome the problems noted above, and realize additional advantages. In accordance with an exemplary embodiment, a method and system achieving a maximum bit rate in a DMT system using a quad spectrum under constraints of avoiding interference with RFI. The methods of an embodiment of the present invention, when combined in various combinations, enhance or optimize bit allocation and utilize bins in notched areas for transmission over short loops without violating the spectral mask.

In one embodiment of the present invention, a method and system for enhancing or optimizing or enhancing or optimizing the bit rate of discrete multi-tone modulation is disclosed. The method and system involves shaping of the power spectral density mask for quad spectrum systems with radio frequency interference notches. For transmitting over short loops, the power is attenuated, using different mask shapes in the frequency domain for different attenuations, and the most flat mask is utilized. For long loops, the method and system of the present invention, turns off the bins that are inside the RFI notches, thereby leaving only the side lobes from neighboring bins.

In another embodiment of the method and system for enhancing or optimizing the bit rate of discrete multi-tone modulation involves shaping of the power spectral density mask for quad spectrum systems with radio frequency interference notches in the time domain, by implementing a transmit filter that runs at a certain frequency. The transmit filter frequency response exhibits notches at two different frequency bands, and the filter has an attenuation that may be utilized to reduce the effects of RFI notches.

In yet another embodiment of the present invention, a method and system for enhancing or optimizing the bit rate of discrete multi-tone modulation involves shaping of the power spectral density mask for quad spectrum systems with radio frequency interference notches, involves the implementation of dummy bins with special data for creating deep notches on the edges, and then placed on both sides of notched bins to mitigate the side lobes caused by the neighbor disturber bins. Disturber bins are identified, and the data in the disturber bins in each symbol may be used to generate dummy tone data that may optimally cancel side lobe energy in the notched bins. In an exemplary application, the results of this cancellation results in an attenuation of the side lobes inside the notched bandwidth, especially at the edges.

The accompanying drawings, which are incorporated in and constitute a part of this specification, illustrate various embodiments of the inventions and, together with the description, serve to explain the principles of the inventions.

BRIEF DESCRIPTION OF THE DRAWINGS

The present inventions can be understood more completely by reading the following Detailed Description of the Invention, in conjunction with the accompanying drawings, in which.

DETAILED DESCRIPTION OF THE INVENTION

The following description is intended to convey a thorough understanding of the inventions by providing a number of specific embodiments and details involving optimal bit rate applications. It is understood, however, that the inventions are not limited to these specific embodiments and details, which are exemplary only. It is further understood that one possessing ordinary skill in the art, in light of known systems and methods, would appreciate the use of the inventions for their intended purposes and benefits in any number of alternative embodiments, depending upon specific design and other needs.

An embodiment of the present invention is directed to methods and systems for achieving a maximum bit rate in a DMT system using a quad spectrum under constraints of avoiding interference, e.g., interference with RFI HAM Radio. Radio Frequency Interference (RFI) may refer to interference from high-frequency electromagnetic waves emanating from electronic devices. HAM radio may represent the Amateur Radio standard with a couple dedicated frequency bands. In particular, the two lowest bands may include 1.81-2 MHz and 3.5-3.75 MHz which are part of the Quad DSL band (25 KHz-4.416 MHz). The rest are above this band. Three exemplary methods, when combined in various combinations, may be implemented to optimize bit allocation and utilize bins in notched areas for transmission over loop lengths (e.g., short loops) without violating a spectral mask.

Figure 1:
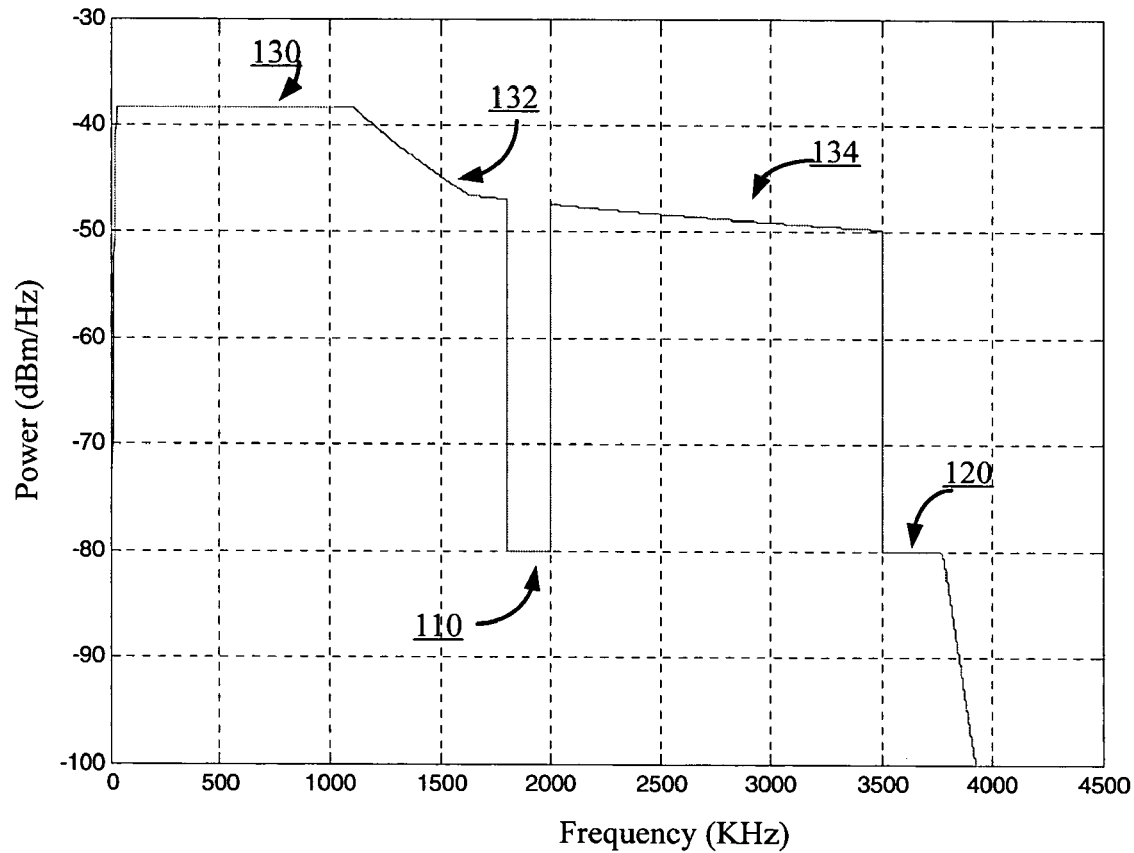
FIG. 1 illustrates an exemplary power spectral density (PSD) mask for an exemplary Quad spectrum system with RFI notches, according to an embodiment of the present invention.

FIG. 1 illustrates an exemplary power spectral density (PSD) mask for an exemplary quad spectrum system with interference notches, e.g., RFI notches, according to an embodiment of the present invention. PSD may refer to the power of a signal measured in the frequency domain, and normalized to a 1 Hz bandwidth. As shown in FIG. 1, there are two notches defined in the band, for example, notch 110 may be defined at approximately 1.81 MHz-2.0 MHz and notch 120 may be defined at approximately 3.5 MHz-3.75 MHz. As shown in FIG. 1, the mask is not flat. More specifically, the mask stays at a level of approximately −40 dBm/Hz, as shown by 130, until about 1104 KHz. The mask then falls to approximately −47 dBm/Hz at about 1622 KHz, as shown by 132, and gradually decreases to approximately −50 dBm/Hz at about 3.5 MHz, as shown by 134 with intervening notch 110.

The PSD level defined for the notch 110 and notch 120 is about −80 dBm/Hz. Comparing the PSD level to the transmit level at a top of the notches, the attenuation that may be required is approximately 30 dB, in this exemplary illustration. Further, it is desirable to still utilize the bins in the notched areas for data transfer without violating the PSD mask. In order to do this, a combination of two or more methods in the frequency domain and in the time domain may be implemented, as discussed in further detail below.

In accordance with an embodiment of the present invention, a first method may involve shaping the power spectral density in the frequency domain. First, when transmitting over short loops, the power may be attenuated in order to keep the received signal within a dynamic range of an analog to digital converter (ADC). Instead of reducing the power equally at all frequencies, a plurality of different mask shapes in the frequency domain may be used for different attenuations, the target being to use the most flat mask possible for enhanced performance. Second, for long loops, the bins inside the identified notches may be disabled or otherwise turned off. Turning off the bins leaves only the side lobes from the neighbor bins. In this example, the side lobes may be approximately 13 dB attenuated compared to the neighbor bins.

Figure 2:
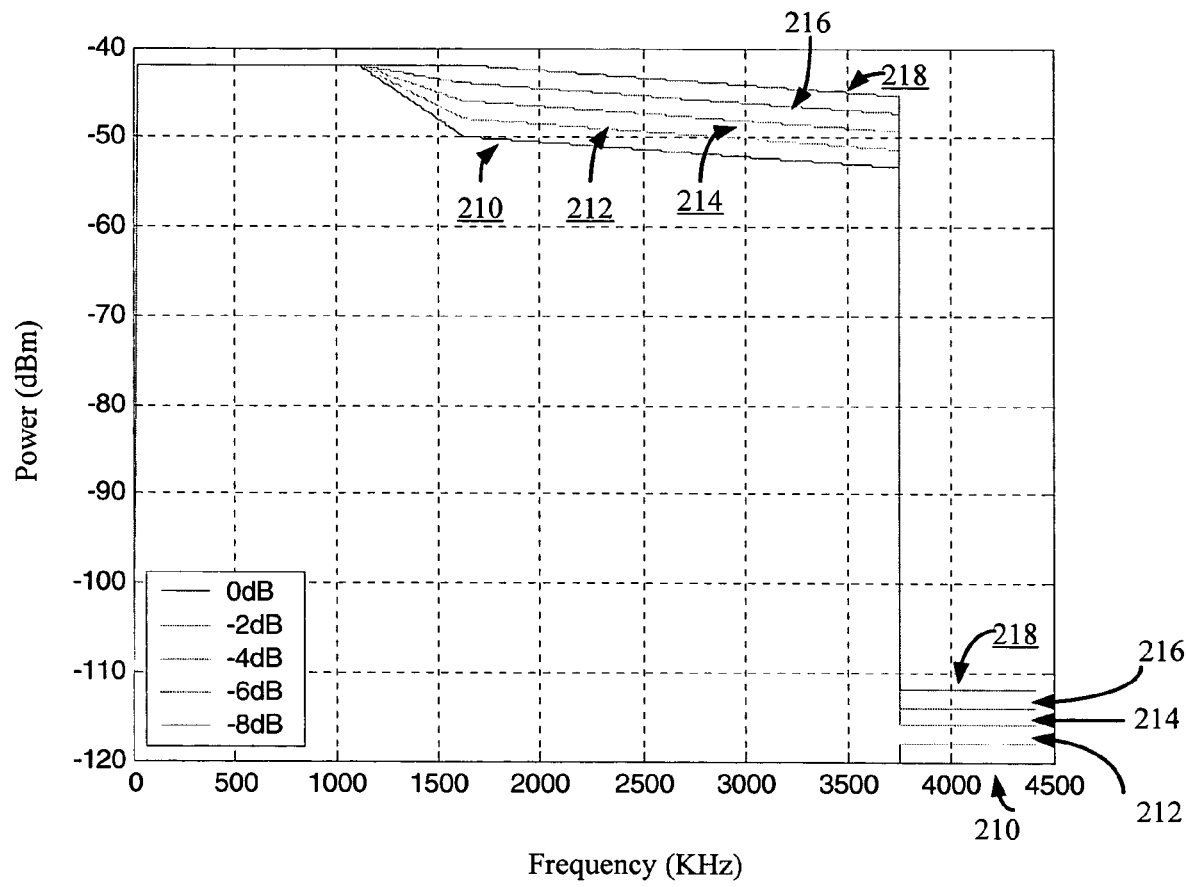
FIG. 2 illustrates a plurality of masks used for different attenuations, according to an embodiment of the present invention.

According to an embodiment of the present invention, FIG. 2 illustrates a plurality of PSD masks used for different attenuations. More specifically, a mask for 0 dB attenuation may be represented by 210, a mask for 2 dB attenuation may be represented as 212, a mask for 4 dB attenuation may be represented as 214, a mask for 6 dB attenuation may be represented as 216 and a mask for 8 dB attenuation may be represented as 218. As shown in FIG. 2, the higher the attenuation, the more flat is the mask used. The attenuation itself may be achieved in an analog domain by using a negative gain, thereby providing a maximum or optimal digital resolution. For example, for attenuation of 0 dB-8 dB, the bins in the notched area may be shut down, thereby achieving 13 dB attenuation. As mentioned above, at least 30 dB attenuation may be desirable for overcoming the effects of the radio frequency interference. For an additional 17 dB, additional methods may be implemented, as discussed below. For attenuations above 8 dB, a substantially flat mask may be used, as shown in FIG. 3.

Figure 3:
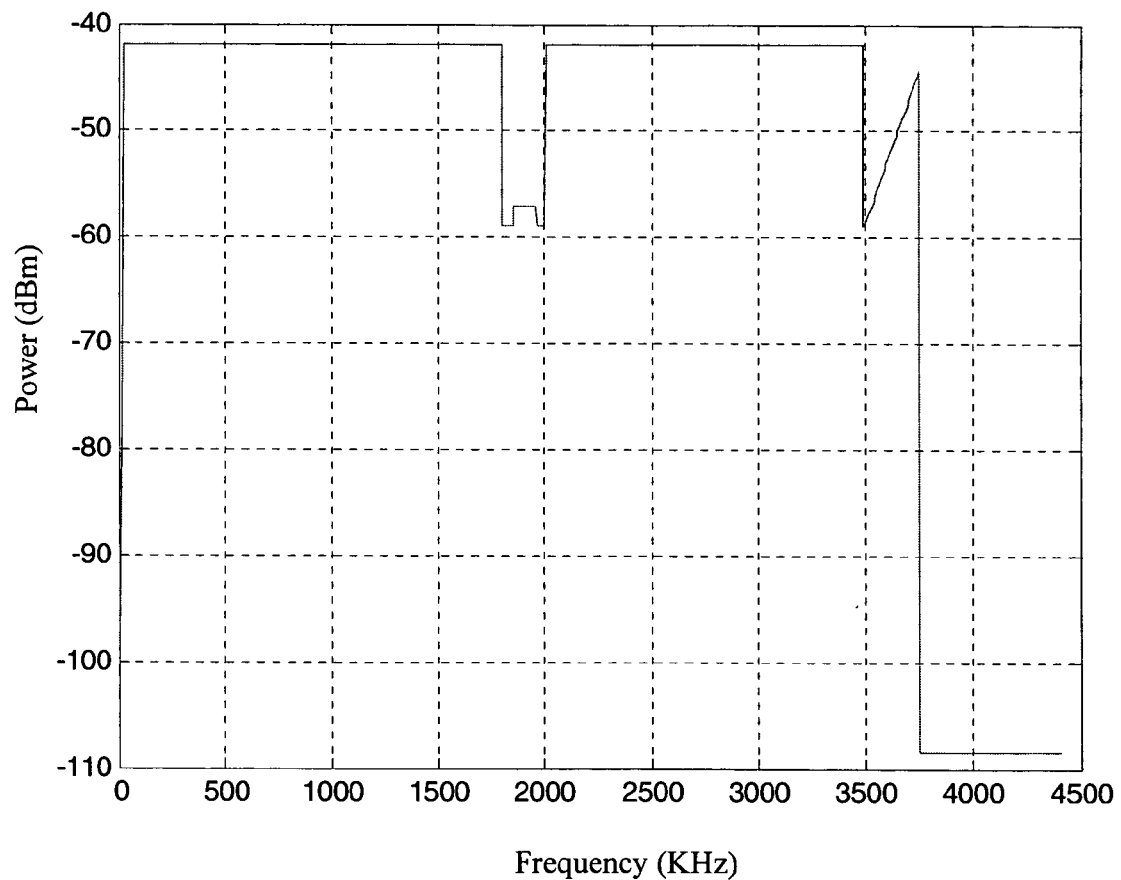
FIG. 3 illustrates a mask used for attenuation above a threshold, according to an embodiment of the present invention.

FIG. 3 illustrates a mask used for attenuation above a threshold (e.g., 10 dB), according to an embodiment of the present invention. An area inside the notch may be shaped in a special mode. For a very short loop (e.g., less than 200 ft), the attenuation may be set at approximately −17 dB lower than the transmission set for long loops and where the bins inside the notch areas are enabled. Since the used data tones outside the notch band generate side lobes with 13 dB attenuation, the signal modulating data inside the notch band is lower than the side lobes, a requirement for maintaining a low PSD in the notch band. By reducing the total power by 17 dB, an additional 13 dB of attenuation is required, compared to 30 dB needed for long loops. Such 13 dB attenuation can come from a frequency mask and a shallow transmit filter notch of 6 dB in combination with the attenuation achieved through the implementation of dummy tones. When the signal is received, the receiver discards a cyclic prefix appended to the beginning of the symbol prior to transmission over the channel, thereby removing the side lobes.

By utilizing the 17 dB attenuation described above, the PSD level in the notched area may be reduced by 17 dB attenuation, along with an the attenuation of 13 dB from the side lobes, yielding a total attenuation of 30 dB (approximately −72 dBm/Hz, compared to −42 dBm/Hz of the original mask). The masks may be used in data mode only. In training, substantially flat masks may be used. As a result, Time Domain Equalizer (TEQ) training may be easier or simplified.

Figure 4:
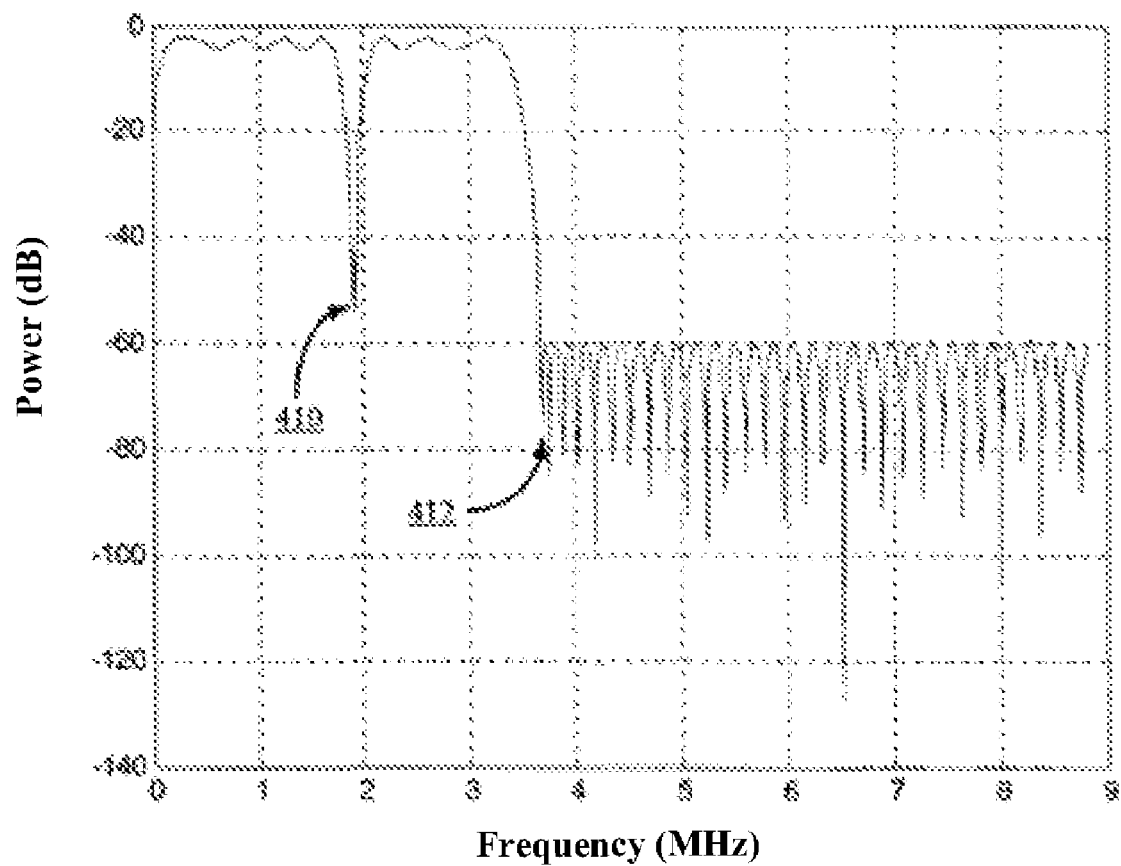
FIG. 4 shows a frequency response of a transmit filter, according to an embodiment of the present invention.

The second method may involve shaping in the time domain, in accordance with another iteration of the present invention. The second method may involve implementing a transmit filter running at a certain frequency, e.g., 17.664 MHz, with a notch at about 1.9 MHz and a cut-off frequency at about 3.5 MHz. FIG. 4 shows the frequency response of the transmit filter, according to an embodiment of the present invention.

The transmit filter may be used at "long" loop lengths of 200 ft and greater, for example. The transmit filter may have an attenuation of about 11 dB around the area of 1.8 MHz-2 MHz, as shown by 410, and at around 3.5 MHz, as indicated by 412. For a worst case scenario, 0 dB power cutback may involve 11 dB attenuation and adding that to the 13 dB attenuation from shutting off the bins, yields about 24 dB attenuation. This still leaves a total of 6 dB excess, which may be addressed by another embodiment of the present invention described below.

For "short" loops of less than 200 ft, for example, a different transmit filter may be implemented. This filter may have a less deep notch at 1.9 MHz, as compared to the filter of FIG. 4 and an upper transition band may be split into two parts. The first part between 3.1 MHz and 3.5 MHz has a gradual slope and the second part has a steep slope above 3.5 MHz. An advantage of using a less deep notch is that Time Domain Equalization is made easier. This is particularly important when the resources for running a longer equalizer are limited.

Figure 5:
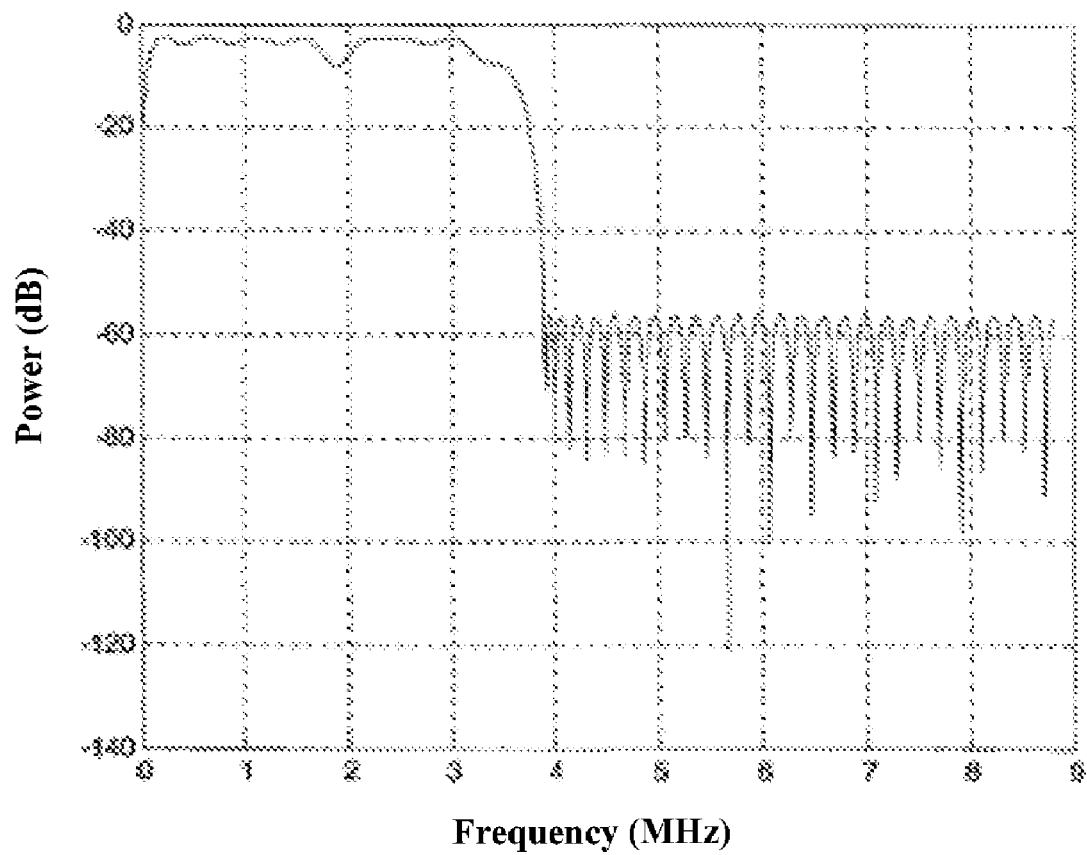
FIG. 5 illustrates a frequency response of a transmit filter for shorter loops, according to an embodiment of the present invention.

FIG. 5 illustrates a frequency response of a transmit filter for shorter loops, according to an embodiment of the present invention. The attenuation of this filter at the notches edges— 1.81 MHz, 2.0 MHz and 3.5 MHz is approximately 4 dB. However, the attenuation is larger at the center of the first notch, around 1.9 MHz, and also in the second notch, above 3.5 MHz. To compensate for this extra attenuation, the frequency mask may be shaped as shown in FIG. 3 where the power inside the notches may be increased.

Figure 6:
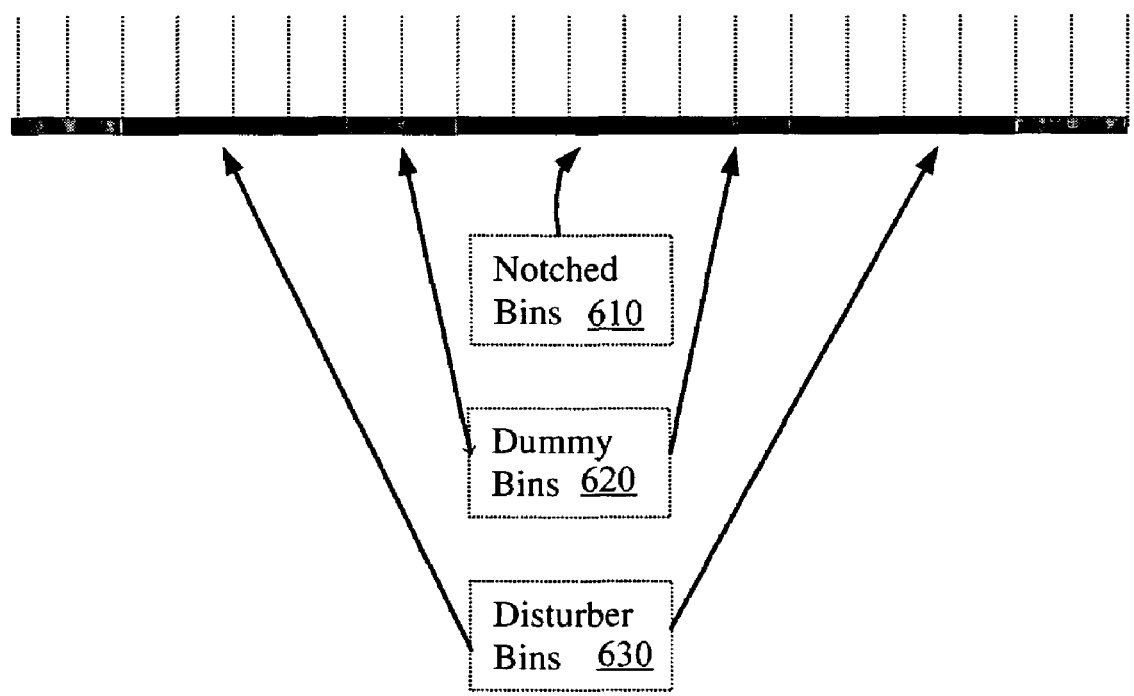
FIG. 6 illustrates notched bins, dummy bins and disturber bins, according to an embodiment of the present invention.

The third method may cancel side lobes in the frequency domain, according to another iteration of the present invention. FIG. 6 illustrates notched bins, dummy bins and disturber bins, according to an embodiment of the present invention. More particular, the third method may involve the use of "dummy bins" with special data that creates deep notches on the edges, and placed on both sides of the notched area to mitigate the side lobes caused by the neighbor "disturber" bins, as illustrated in FIG. 6. Notch bins are represented by 610, dummy bins are represented as 620 and disturber bins are represented as 630. A related description of this concept has been disclosed in U.S. patent application Ser. No. 10/849,569 entitled "Fourier Transform Side Lobe Mitigation," filed May 20, 2004, the disclosure of which is incorporated by reference in its entirety. The data in the disturber bins in each symbol may be used to generate dummy bins data that may optimally cancel side lobes energy in the notched bins. The results of this cancellation show about 5-6 dB attenuation of the side lobes inside the notch, especially at the edges.

Figure 7:
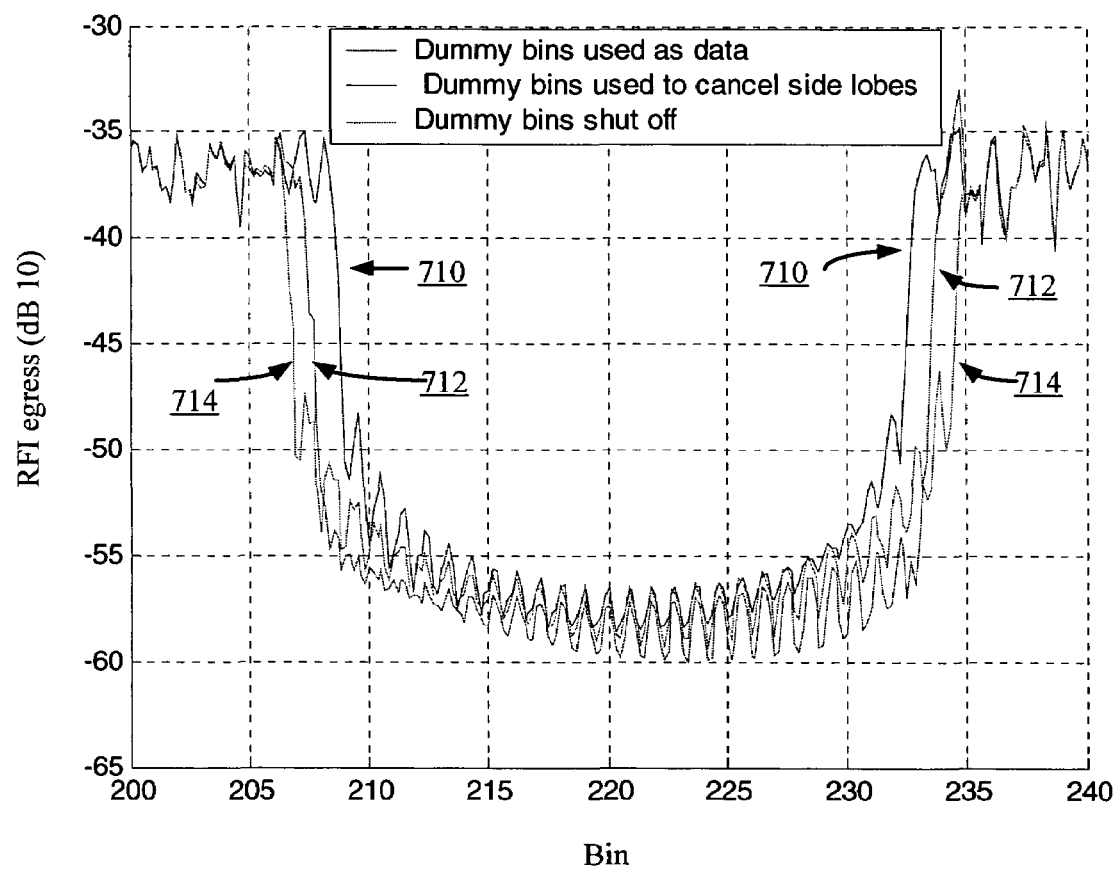
FIG. 7 shows an example of a cancellation effect, according to an embodiment of the present invention.

FIG. 7 shows an example of the effect of the cancellation of the side lobes. Dummy bins used as data are represented by 710, dummy bins used to cancel side lobes is represented by 712 and dummy bins that are shut off are represented by 714. As shown in FIG. 7, using the dummy bins to cancel the side lobes improves the attenuation inside the notch by 5-6 dB compared to using them as data. Shutting the dummy bins off yields less attenuation, such as 2-3 dB compared to the canceling of the side lobes.

An embodiment of the present invention is directed to various methods used to optimize the bit rate in the presence of RFI notches or other interference notches. By combining time domain and frequency domain methods, optimal performance may be achieved. For example, the first and second method discussed above may be combined. The third method may be an optional method. Other combinations of the methods may be implemented in accordance the various embodiments of the present inventions.

As discussed above, the method and system for enhancing or optimizing bit rate may be incorporated at the central office (CO) end and at the customer premise equipment (CPE) end. The CO end and the CPE end may include a modem, transceiver or other communication device.

A method and system for enhancing or optimizing bit rate on a DMT system with RFI notches may involve: attenuating power of a signal by using a plurality of mask shapes in a frequency domain for different attenuations and applying a transmit filter in a time domain to the attenuated signal depending on a loop length, wherein one or more bins in one or more notched areas are utilized for transmission over the loop length without violating a spectral mask. In accordance with other aspects of an exemplary embodiment, the loop length may be less than a certain threshold, e.g., less than 200 feet; the plurality of masks may be substantially flat masks for loop lengths less than a certain threshold, e.g., less than 200 feet; if the loop length is greater than a threshold, e.g., greater than 200 feet, the bins inside the one or more notched areas may be turned off.

While the foregoing description includes many details and specificities, it is to be understood that these have been included for purposes of explanation only, and are not to be interpreted as limitations of the present inventions. Many modifications to the embodiments described above can be made without departing from the spirit and scope of the inventions.

The present invention is not to be limited in scope by the specific embodiments described herein. Indeed, various modifications of the present inventions, in addition to those described herein, will be apparent to those of ordinary skill in the art from the foregoing description and accompanying drawings. Thus, such modifications are intended to fall within the scope of the following appended claims. Further, although the present inventions have been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present inventions as disclosed herein.

We claim:

1. A method for enhancing bit rates in a discrete multi-tone quad spectrum system, comprising:
    shaping in the time domain, a power spectral density PSD mask associated with a signal;
    implementing a transmit filter that operates at a certain frequency, with one or more notched areas at specific frequencies for a short loop transmit filter characterized by a shallow notch utilized for transmissions over short loops to facilitate smoother time domain equalization for resource-limited equalizers;
    implementing a second transmit filter for a long loop with one or more notched areas, wherein the short loop and the long loop are defined based on a predetermined threshold, and wherein the one or more notched areas for the short loop transmit filter have less depth than the one or more notched areas for the long loop transmit filter;
    determining bins associated with the notched areas; and
    determining the amount of attenuation of the signal power required to overcome the notched areas in the PSD mask.

2. The method of claim 1, wherein the transmit filter operates at a frequency of 17.664 MHz.

3. The method of claim 1, wherein the one or more notched areas comprise a first notch at a first notch frequency of 1.8-2.0 MHz and a second notch at a second notch frequency of 3.5-3.8 MHz.

4. The method of claim 1, wherein the shallow notch of the transmit filter is characterized by a shallow notch located at approximately 1.9 MHz and is utilized for transmissions over short loops.

5. The method of claim 1, wherein 0 dB power cutback yields an 11 dB attenuation.

6. A system for enhancing bit rates in a discrete multi-tone quad spectrum system, comprising:
    a module for shaping in the time domain, a power spectral density PSD mask associated with a signal;
    a module for implementing a transmit filter that runs at a certain frequency, with one or more notched areas at specific frequencies for a short loop characterized by a shallow notch utilized for transmissions over a short loop to facilitate smoother time domain equalization for resource-limited equalizers, the module further configured to implement a second transmit filter for a long loop with one or more notched areas, wherein the short loop and the long loop are defined based on a predetermined threshold, and wherein the one or more notched areas for the short loop transmit filter have less depth than the one or more notched areas for the long loop transmit filter;
    a module for determining bins associated with the notched areas; and
    a module for determining the amount of attenuation of the signal power required to overcome the notched areas in the PSD mask.

7. The system of claim 6, wherein the transmit filter is running at a frequency of 17.664 MHz.

8. The system of claim 6, wherein the notched areas are at frequencies between 1.8-2.0 MHz, and 3.5 MHz.

9. The system of claim 6, wherein a transmit filter with a shallow notch at 1.9 MHz is utilized for transmissions over short loops.

10. The system of claim 6, wherein 0 dB power cutback yields an 11 dB attenuation.

11. A system for enhancing bit rates in a discrete multi-tone quad spectrum system, comprising:
   means for shaping in the time domain, a power spectral density PSD mask associated with a signal;
   means for implementing a transmit filter that runs at a certain frequency, with one or more notched areas at specific frequencies for a short loop characterized by a shallow notch utilized for transmissions over a short loop to facilitate smoother time domain equalization for resource-limited equalizers, the module further configured to implement a second transmit filter for a long loop with one or more notched areas, wherein the short loop and the long loop are defined based on a predetermined threshold, and wherein the one or more notched areas for the short loop transmit filter have less depth than the one or more notched areas for the long loop transmit filter;
   means for determining bins associated with the notched areas; and
   means for determining the amount of attenuation of the signal power required to overcome the notched areas in the PSD mask.

12. The system of claim 11, wherein the transmit filter is configured to operate at a frequency of 17.664 MHz.

13. The system of claim 11, wherein the notched areas are located at frequencies between 1.8-2.0 MHz, and 3.5 MHz.

14. The system of claim 11, wherein a transmit filter with a shallow notch at 1.9 MHz is utilized for transmissions over short loops.

15. The system of claim 11, wherein 0 dB power cutback yields an 11 dB attenuation.

* * * * *

UNITED STATES PATENT AND TRADEMARK OFFICE
CERTIFICATE OF CORRECTION

| | |
|---|---|
| PATENT NO. | : 7,564,932 B2 |
| APPLICATION NO. | : 10/996054 |
| DATED | : July 21, 2009 |
| INVENTOR(S) | : Barak et al. |

It is certified that error appears in the above-identified patent and that said Letters Patent is hereby corrected as shown below:

In Col. 8, line 9 (claim 1), delete "a transmit filter that operates at a certain frequency, with one or more notched areas at specific frequencies for a short loop";

In Col. 8, line 32 (claim 4), delete "characterized by a shallow notch";

In Col. 8, line 33 (claim 4), delete "and is utilized for transmissions over short loops";

In Col. 3, line 41 (claim 6), delete "that runs at a certain frequency, with one or more notched areas at specific frequencies for a short loop".

Signed and Sealed this
Eighth Day of March, 2011

David J. Kappos
*Director of the United States Patent and Trademark Office*